Nov. 5, 1940.   G. W. SCHATZMAN   2,220,352
FENDER SKIRT MOUNTING
Filed June 30, 1938
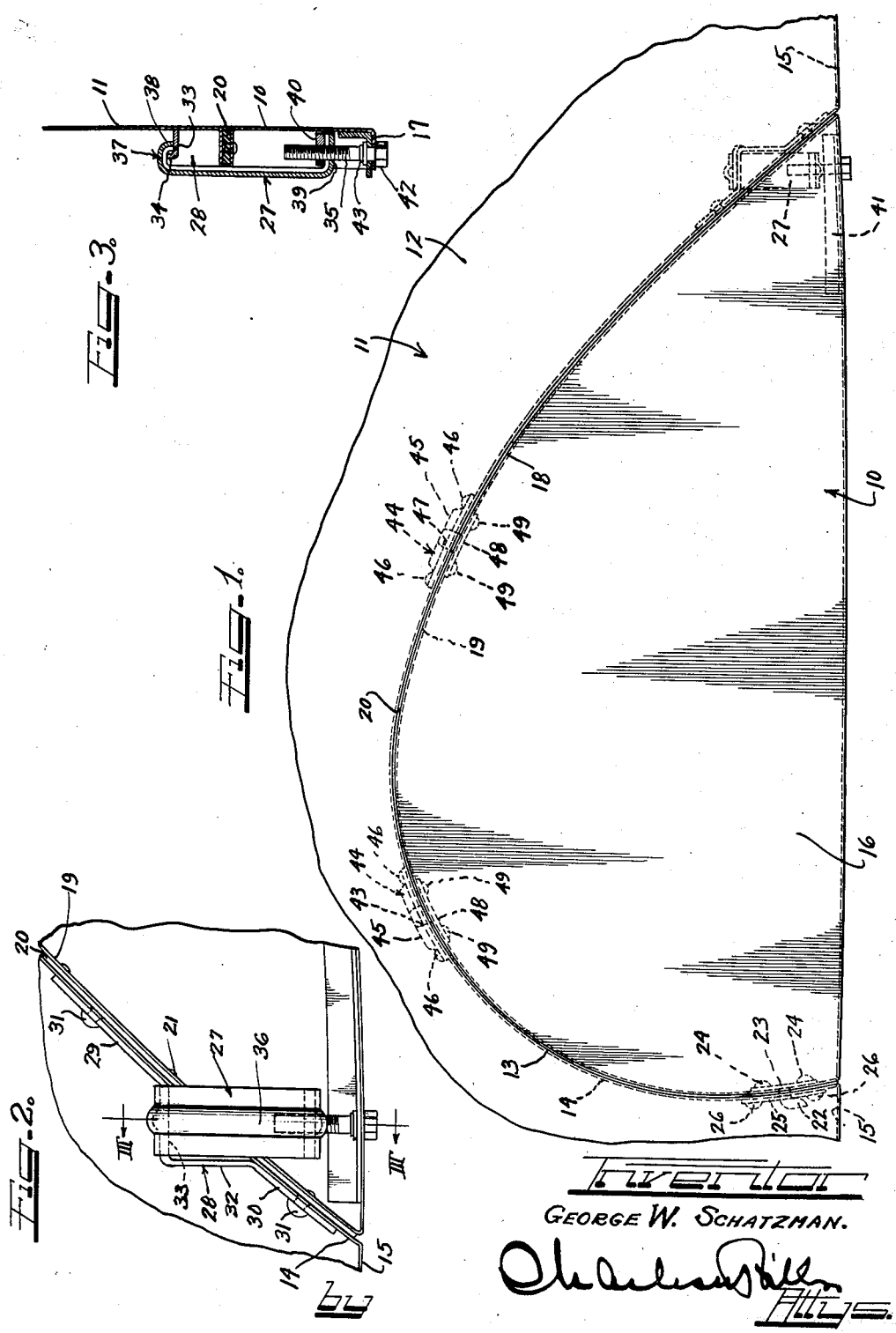
Inventor
GEORGE W. SCHATZMAN.

Patented Nov. 5, 1940

2,220,352

UNITED STATES PATENT OFFICE 2,220,352

FENDER SKIRT MOUNTING

George W. Schatzman, Detroit, Mich., assignor, by mesne assignments, to Houdaille-Hershey Corporation, Detroit, Mich., a corporation of Michigan Application June 30, 1938, Serial No. 216,645

4 Claims. (Cl. 292—256)

This invention relates to ornamental fender skirts, and more particularly to a novel fender skirt mounting means for detachably securing the ornamental fender skirt on a vehicle fender.

In designing ornamental fender skirts or shields of the type which are adapted to cover the usual wheel access opening in a vehicle fender, it is important that the means which is employed to secure the fender skirt in desired position be simple and quick to operate both in the assembly of the fender skirt on the vehicle fender and in removing it therefrom. It must also possess the desired degree of ruggedness when in use and be substantially free from vibration and noise.

It is an object of this invention to provide a novel ornamental fender skirt and fender skirt mounting which possesses the above highly desirable characteristics.

It is another object of this invention to provide an improved fender skirt and fender skirt mounting which is economical to manufacture and which is rugged and reliable in use.

It is a further object of this invention to provide novel means for supporting the fender skirt in desired position over the usual wheel access opening in a vehicle fender and for urging the fender skirt upwardly in the plane of the fender opening to maintain the fender skirt in desired tight cooperating engagement with the fender.

Another and still further object of this invention is to provide a novel form of clamping bracket and adjustable clamping strap for detachably securing a fender skirt to a vehicle fender.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawing, in which:

Figure 1 is a front elevational view of a vehicle fender, fender skirt, and mounting means therefor;

Figure 2 is an enlarged fragmentary rear elevational view of the clamping bracket and clamping strap employed to detachably secure one corner of the fender skirt to the vehicle fender; and Figure 3 is a cross-sectional view taken along the line III—III of Figure 2.

In Figure 1 of the drawing, I have illustrated a fender skirt 10 constructed in accordance with the teachings of the present invention assembled on a vehicle fender 11, such for example, as the rear fender of an automobile. While the fender 11 has not been illustrated in detail, it is shown as having a downwardly extending outer side wall portion 12 which is provided with the usual wheel access opening 13. The ornamental fender skirt 10 is disposed over the opening 13 in such a manner as to substantially close the opening and to harmonize with the outer side wall portion 12 of the fender 11. The outer surface of the fender skirt 10 may, of course, be substantially smooth, as illustrated in the drawing, or it may assume any other desired configuration for the purpose of ornamentation.

As is shown in Figures 1 and 2, the outer marginal edge of the fender 11 which defines the opening 13 is inturned as at 14, while the outer marginal edges which define the base of the fender 11 are inturned as at 15. As is well known to those skilled in the art, fenders of the type which are now commonly employed are generally provided with these inturned edge portions to increase the rigidity of the fender. As will presently be explained, advantage is taken of this feature to assemble and secure the ornamental fender skirt over the fender opening.

The fender skirt 10 includes a principal body portion or panel 16 which extends entirely across the wheel opening 13. This panel portion 16 terminates in a substantially straight lower edge 17, which is bent at substantially a right angle to the panel portion 16 and extends rearwardly, as is clearly shown in Figure 3 of the drawing. The curved edge portion 18 of the panel 16 of fender skirt 10 is formed by bending a portion of the material of the fender skirt rearwardly to form an inturned flange 19 which is preferably complementary to the inturned flange 14 of the fender 11.

In order to prevent rattling or other noises resulting from a direct metal-to-metal contact, a cushioning strip 20 formed of some suitable cushioning material such as rubber is secured to the inturned flange 19 of the fender skirt 10 in any suitable manner, such as by riveting it as at 21. It is to be understood, however, that this cushioning strip or anti-rattling may be omitted from the assembly without departing from the spirit and scope of the present invention.

The fender skirt mounting means by which the fender skirt 10 is detachably secured to the fender 11 will now be described. As will presently be more fully explained, the mounting means includes means for vertically supporting the fender skirt and also additional means for restricting lateral movement of the fender skirt with respect to the vehicle fender at points thereon remote from the vertical supporting means. Secured to one of the lower corners of the fender skirt 10 is a hook-shaped member 22 which includes a base portion 23 formed to be seated on the inturned flange 19 of the fender skirt 10. The base 23 of the hook member 22 is secured in any suitable manner to the inturned flange 19, such as by rivets 24, the base 23 preferably being disposed on the inner side of the inturned flange 19 with the principal body part of the hook member 22 extending through a suitable aperture in the flange 19. A hook engaging plate 25 is secured to the inner face of the inturned flange 14 of fender 11 in any suitable manner, such as by rivets 26, both the plate 25 and the inturned flange 14 being suitably slotted for the reception of the hook-shaped member 22.

At the opposite end of the fender skirt 10 an adjustable clamping strap is provided which is arranged to engage a step-shaped clamping bracket 28 mounted on the fender 11. The particular form of the clamping strap 27 and of the step-shaped clamping bracket 28 is illustrated in detail in Figures 2 and 3 of the drawing.

The step-shaped clamping bracket 28 includes upper and lower wings or base portions 29 and 30 which are arranged to be seated on the inturned flange 14 of the fender 11 and be secured thereto, such as by rivets 31. The step-shaped portion of the member 28 includes an upstanding or substantially vertically disposed portion 32 and a substantially horizontally disposed portion 33. The rear edge of the substantially horizontally disposed portion 33 is upturned, as at 34 to provide a suitable lip to prevent the clamping strap 27 from becoming disengaged therewith when disposed in mounted position.

The clamping strap 27 is adjustably mounted on the fender skirt 10 by means of a clamping bolt 35, and is arranged to engage the horizontal portion 33 of the step-shaped bracket member 28. The clamping strap 27 is preferably provided with a reinforcing rib 36 which provides the necessary rigidity to the strap to render it effective in the assembly. The upper part of the strap 27 is bent rearwardly as at 37 and then downwardly as at 38 to extend over and behind the upturned lip 34 of the step-shaped clamping bracket 28. The lower end of the clamping strap 27 is turned inwardly, as at 39, and is suitably apertured to permit the threaded shank of the bolt 35 to pass therethrough. A bolt engaging plate 40 is preferably welded on the inturned portion 39 and threaded for complementary engagement with the threaded shank of the clamping bolt 35.

To provide a suitable support for the clamping bolt 35 a relatively short angle iron 41 is secured to the inturned base flange 17 of the fender skirt 10 in any suitable manner such as by spot welding. The angle iron 41 is positioned so that one face of the angle iron is seated on the inturned base flange 17 while the other face of the angle iron 41 is seated against the rear face of the panel 16 of the fender skirt 10. The inturned base edge 17 of the fender skirt 10 and the portion of the angle iron 41 lying thereagainst are apertured for the reception and mounting of the bearing portion 42 of the clamping bolt 35. A suitable collar 43 is pressed onto the clamping bolt 35 and secured thereto after the clamping bolt 35 has been passed through the aperture in the base flange 17 and the angle iron 41 to retain the same thereon.

From the above description, it will at once be apparent that after the hook member 22 has been hooked through the hook engaging plate 25 and the clamping strap 27 hooked over the upstanding lip 34 of the horizontal portion 33 of the step-shaped clamping bracket 28, the clamping bolt 35 may be tightened to pull the fender skirt upwardly into tight engagement with the vehicle fender 11. Some means, however, must be provided to restrict lateral movement of the top of the fender skirt 10 with respect to the fender 11 since the means above described provides primarily a vertical support for the fender skirt and limits lateral movement of the fender skirt only at the lower corners thereof. One suitable form and means for limiting lateral movement of the upper part of fender skirt 10 has been illustrated in Figure 1. More particularly, a pair of plates 44 having longitudinally depressed recesses therein, such as may be formed by a central pressed up portion 45 of the plate 44 upwardly, are secured to the inturned flange 14 in any suitable manner, such as by rivets 46. The flange 14 of the fender 11 is provided with longitudinal slots immediately under the recesses provided by the pressed up portions 45 of the plate 44 to permit the passage therethrough of suitable stop members 47 carried on the fender skirt 10. The stop members 47 include a base 48 which is secured to the underside of the inturned flange 19 of the fender skirt 10 in any suitable manner, such as by rivets 49. The recess provided by the pressed up portion 45 of the plate 44 and the longitudinal slot in the inturned flange 14 of the fender 11 are preferably somewhat longer than the width of the stop member 47 in order that the stop member 47 may be moved up into position by a rocking motion of the fender skirt about the hook member 22. As will at once be apparent to those skilled in the art, the stop members 47 will confine the upper portion of the fender skirt 10 in desired position on the vehicle fender 11.

The manner in which the fender skirt 10 is mounted on the fender 11 will now be described. Assuming that the fender skirt 10 has previously been removed from the fender 11 and it is now desired to replace the same thereon, the fender skirt 10 is lifted into position adjacent the opening 14 in the fender 11 and the hook member 22 is hooked through the hook-engaging plate 25 of the fender 11. During this hooking operation, it will readily be perceived that the opposite corner of the fender skirt 10 must be slightly lower than the lower edge of the fender 11. After the hooking engagement of the hook member 22 has been made with the plate 25, the opposite end of the fender skirt 10 is lifted upwardly and the stop members or guide pins 47 are guided into their respective slots and recesses. The clamping bolt 35 has, of course, prior to the mounting operation, been unscrewed to a sufficient extent to permit the turned down end 38 of the clamping strap 27 to pass over the upstanding lip 34 of the step-shaped clamping bracket 28, the clamping bracket 28 of course being hooked in from behind. Thereafter the clamping bolt 35 is tightened until the fender skirt 10 has been moved up into tight and snug engagement with the vehicle fender 11. To dismount the fender skirt 10 from the fender 11, the above-described operations are carried out in reverse order.

While I have shown a particular embodiment of my invention, it will, of course, be understood that I do not wish to be limited thereto, since many modifications may be made, and I therefore contemplate by the appended claims to cover all such modifications as fall within the true spirit and scope of my invention.

I claim as my invention:

1. In a fender and fender skirt assembly which includes means for restraining lateral displacement of the fender skirt and means for vertically supporting one end of said fender skirt, said fender having an obliquely inclined edge in proximity to the opposite end of said fender skirt: latching mechanism disposed in proximity to said opposite end of said fender skirt for pulling the fender engaging edge of said fender skirt into tight engagement with said fender comprising a clamping strap carried by said fender skirt and mounted thereon for substantially vertical adjustment, said strap detachably engaging said fender adjacent said inclined edge, and means for tightening said strap to pull said fender skirt into tight engagement with said fender, said tightening means extending down to a point in proximity to the lower edge of said fender skirt thereby to facilitate adjustment thereof.

2. In a fender skirt assembly adapted to fit onto a fender having an inturned wheel opening defining edge and a supporting member above said wheel opening; a latching mechanism comprising an upstanding C-shaped strap arranged to hook onto said supporting member, the lower end of said C-shaped strap having a threaded opening therein, and a bolt carried by said fender skirt and extending upwardly from the lower edge thereof into threaded engagement with said C-shaped strap, thereby providing means for pulling said fender skirt upwardly toward said supporting member.

3. In a fender shield having an upright panel with a flange on the edge thereof adapted to fit against a flange on a fender; a hook having an upright portion extending up past said fender shield flange and having upper and lower end portions projecting towards the plane of said panel above and below said fender shield flange, and an upright screw threaded in said lower hook end portion and journaled on the back of said panel.

4. In a fender shield having an upright panel with a flange on the edge thereof adapted to fit against a flange on a fender; a hook having an upright portion extending up past said fender shield flange and having upper and lower end portions projecting towards the plane of said panel above and below said fender shield flange, said upper end portion having a downwardly projecting terminal lip, and an upright screw threaded in said lower hook end portion and journaled on the back of said panel.

GEORGE W. SCHATZMAN.